United States Patent
Kung et al.

(10) Patent No.: US 12,547,863 B2
(45) Date of Patent: Feb. 10, 2026

(54) CARD CONNECTOR WITH TWO SPRING-LOADED MECHANISMS FOR INSERTING AND EJECTING THE CARD

(71) Applicants: JINN SHYANG PRECISION INDUSTRIAL CO., LTD., New Taipei (TW); Chiun Hui Technology Co., Ltd., New Taipei (TW)

(72) Inventors: Shu-Chu Kung, New Taipei (TW); Ching-Chia Chu, New Taipei (TW)

(73) Assignees: JINN SHYANG PRECISION INDUSTRIAL CO., LTD., New Taipei (TW); CHIUN HUI TECHNOLOGY CO., LTD., New Taipei (TW)

( * ) Notice: Subject to any disclaimer, the term of this patent is extended or adjusted under 35 U.S.C. 154(b) by 300 days.

(21) Appl. No.: 18/450,613

(22) Filed: Aug. 16, 2023

(65) Prior Publication Data

US 2023/0401404 A1    Dec. 14, 2023

Related U.S. Application Data

(63) Continuation-in-part of application No. 17/488,624, filed on Sep. 29, 2021, now Pat. No. 11,843,199.

(30) Foreign Application Priority Data

Oct. 8, 2020    (TW) ................. 109213258

(51) Int. Cl.
*G06K 13/08* (2006.01)
*G06K 7/00* (2006.01)
(Continued)

(52) U.S. Cl.
CPC ......... *G06K 13/085* (2013.01); *G06K 7/0056* (2013.01); *H01R 12/7023* (2013.01);
(Continued)

(58) Field of Classification Search
CPC .. G06K 13/085; G06K 7/0056; G06K 7/0073; H01R 12/7023; H01R 12/7005;
(Continued)

(56) References Cited

U.S. PATENT DOCUMENTS

| 2013/0237097 A1 | 9/2013 | Nakamura |
| 2015/0162681 A1* | 6/2015 | Chen ................. G06K 13/0831 |
| | | 439/153 |

FOREIGN PATENT DOCUMENTS

| CN | 200956459 Y | * 10/2007 | |
| CN | 104916993 A | * 9/2015 | ........... H01R 13/642 |
| CN | 107425315 A | 12/2017 | |

* cited by examiner

*Primary Examiner* — Justin M Kratt
(74) *Attorney, Agent, or Firm* — MUNCY, GEISSLER, OLDS & LOWE, P.C.

(57) ABSTRACT

A card connector includes an insulating holder base having a first slideway and a second slideway formed on both sides of a plug-in space therein, a terminal set with multiple conductive terminals set in the plug-in space, and a push-push mechanism including a main sliding seat and an auxiliary sliding seat independently structured and respectively set in the first slideway and the second slideway. The main sliding seat is provided with a first resisting arm, and a cyclic guide groove and a guide rod for sliding positioning. The auxiliary sliding seat has a second resisting arm. The first resisting arm and the second resisting arm are used for resisting and moving a combined structure of a preset SIM card and a tray, so that when the main sliding seat and the auxiliary sliding seat are moving, the main sliding seat has a greater resistance than the auxiliary sliding seat.

11 Claims, 14 Drawing Sheets

(51) Int. Cl.
*H01R 12/70* (2011.01)
*H01R 12/71* (2011.01)
*H01R 13/24* (2006.01)
*H01R 13/648* (2006.01)
*H01R 13/658* (2011.01)
*H01R 13/6591* (2011.01)
*H01R 13/6594* (2011.01)

(52) U.S. Cl.
CPC ........ *G06K 7/0073* (2013.01); *H01R 12/7005* (2013.01); *H01R 12/7017* (2013.01); *H01R 12/71* (2013.01); *H01R 12/712* (2013.01); *H01R 12/714* (2013.01); *H01R 12/716* (2013.01); *H01R 13/24* (2013.01); *H01R 13/2407* (2013.01); *H01R 13/2442* (2013.01); *H01R 13/648* (2013.01); *H01R 13/658* (2013.01); *H01R 13/6591* (2013.01); *H01R 13/6594* (2013.01); *H01R 2201/16* (2013.01)

(58) Field of Classification Search
CPC .. H01R 12/7017; H01R 12/71; H01R 12/712; H01R 12/714; H01R 12/716; H01R 13/24; H01R 13/2407; H01R 13/2442; H01R 13/648; H01R 13/658; H01R 13/6591; H01R 13/6594; H01R 2201/16
See application file for complete search history.

CARD CONNECTOR WITH TWO SPRING-LOADED MECHANISMS FOR INSERTING AND EJECTING THE CARD

CROSS-REFERENCE TO THE RELATED APPLICATIONS

This application is a Continuation-In-Part of application Ser. No. 17/488,624, filed on Sep. 29, 2021, for which priority is claimed under 35 U.S.C. § 120, the entire contents of which are hereby incorporated by reference.

This application claims the priority benefit of Taiwan patent application number 109213258, filed on Oct. 8, 2020.

BACKGROUND OF THE INVENTION

1. Field of the Invention

The present invention provide a card connector with two spring-loaded mechanisms for inserting and ejecting the card, more particularly to a card connector in which the main sliding seat and the auxiliary sliding seat are designed independently and separately: the main sliding seat has a cyclic guide groove and a guide rod for sliding positioning to form a large sliding resistance, while the auxiliary sliding seat has no guide groove and guide rod structure to form a small sliding resistance: the main sliding seat forms the positioning structure for the combined structure of the SIM card and the tray to be inserted into of the first position and the second position in the card connector, and the auxiliary sliding seat only maintains the balance of the abutment side of the tray without any positioning structure. This design can effectively avoid the problem of uneven movement or jamming between the pusher and the base when the sliding movement on both sides of the conventional card connector are not synchronized, so the present invention can achieve the advantages of smooth operation and long service life.

2. Description of the Related Art

Today's electronic products such as smart phones, notebook computers, and wireless communication devices need to insert a subscriber identity module (SIM) card to make a wireless connection with a mobile communication base station (Cell Site) and download/upload data transfer. On the other hand, the data storage requirements of various electronic products are also increasing, and it is often necessary to make up for it by inserting a memory card. The development of electronic products toward light, thin, short, and small makes the internal space extremely compact. Therefore, when the SIM card or memory card is inserted into the card connector of the electronic product, it is easy to be skewed or shifted due to the direction of force or improper operation, which will cause the SIM card or memory card to collide or push against the terminal set in the card connector. It is easy to cause the conductive terminals of the card terminal set to be skewed or twisted or the multiple metal contacts on the SIM card or memory card to be scratched or worn, which will further cause the SIM card or memory card to be difficult to insert and withdraw from the card connector or the problem of unstable electrical connection.

In order to make the SIM card or memory card insert and take out smoothly in the electronic device, some manufacturers have provided a push-push mechanism on one side inside the card connector. The push-push mechanism has a sliding seat that slides elastically, and a resisting arm that is supported on the card edge and is linked with the sliding seat to make the SIM card or memory card press and push into the card connector for the first time to form the insertion positioning state and the second time to form the removal state. However, this kind of push-push mechanism tends to be skewed or shifted due to only one side of the push action, which causes the problem that the SIM card or memory card is not easy to insert and withdraw from the card connector.

In order to solve the above-mentioned unilateral push-push mechanism problem, another manufacturer has developed a bilateral push-push mechanism. Please refer to FIGS. 9 and 10, which are the structural top view of the conventional card connector and the structural top view of the pusher. A plurality of conductive terminals A11 are pierced through the base A1 of the card connector and a pusher A2 is provided on the base A1. The pusher A2 has a symmetrical first sliding seat A21 and a second sliding seat A22 with a connecting portion A23 between them. The components of the first sliding seat A21 include a first guide groove A211, a first guide rod A212 and an elastic member A24. The components of the second sliding seat A22 include a second guide groove A221, a second guide rod A222 and an elastic member A24. Although this kind of structure can make both sides produce synchronous slippage, when the first sliding seat A21 or the second sliding seat A22 broke down (for example: first, second guide rod A212, A222 or elastic member A24 is skewed or loose), it will lead to asynchronous sliding movement on both sides, which will further cause the problem of unsmooth movement or jamming between the pusher A2 and the base A1, and cause damage to the internal structure of the card connector.

Since the above two conventional card connectors with push-push mechanism each have their own shortcomings, both of which may cause the card connector to be inserted and withdrawn incorrectly, as well as more serious failure problems, which need to be solved by those engaged in this industry. All may cause the card connector to be plugged in and ejected,

SUMMARY OF THE INVENTION

In view of the above-mentioned problems and deficiencies, the inventor collected relevant information, and after various evaluations and considerations, the invention of this card connector with two spring-loaded mechanisms for inserting and ejecting the card was designed and born.

The main object of the present invention is to provide a card connector, including: an insulating holder base, which has a plug-in space, a plurality of through-holes, a terminal set with a plurality of conductive terminals inside, and a first slideway and a second slideway formed on both sides of the plug-in space; and a push-push mechanism, which includes a main sliding seat set in the first slideway and an auxiliary sliding seat set in the second slideway. The main sliding seat and the auxiliary sliding seat are each in an independent structure. The main sliding seat has a first resisting arm at one side and is equipped with a cyclic guide groove and a guide rod for sliding positioning. The auxiliary sliding seat has a second resisting arm at one side. The first resisting arm and the second resisting arm are used for resisting and moving a combined structure of a preset SIM card and a tray; so that when the main sliding seat and the auxiliary sliding seat are moving, the main sliding seat has a greater resistance than the auxiliary sliding seat. Since the main sliding seat and auxiliary sliding seat are designed as independent structures, the main sliding seat is equipped with a cyclic guide groove and a guide rod for sliding positioning to form a large sliding resistance, while the auxiliary sliding seat has no guide groove and guide rod structure to form a small sliding resistance. The main sliding seat is used to form the positioning structure for a combined structure of a SIM card and a tray to be inserted into of a first position and a second position in the card connector, while the auxiliary sliding seat only maintains the balance of the front end of the card edge without any positioning structure. This kind of design can effectively avoid the problem of uneven movement or jamming between the push-push mechanism and the insulating holder base when the sliding movements on both sides of the conventional card connector are not synchronized, so the present invention can achieve the advantages of smooth operation and long service life.

Another object of the present invention is that the length of the main sliding seat is shorter than the auxiliary sliding seat, and the first resisting arm of the main sliding seat and the second resisting arm of the auxiliary sliding seat are for asynchronous movement when the SIM card or the tray is resisted.

Still another object of the present invention is that the length of the main sliding seat is equal to the auxiliary sliding seat, and the first resisting arm of the main sliding seat and the second resisting arm of the auxiliary sliding seat are moved synchronously for the SIM card or the tray to resist.

Still another object of the present invention is that the cyclic guide groove provided on the main sliding seat is heart-shaped, comprising a fixed point for one end of the guide rod to slide to a first position, a first chute and a first pathway continuously extended from the fixed point toward a first side of the guide groove, a positioning point traversing from the first pathway to a heart-shaped depression therein for one end of the guide rod to slide to a second position, and a second pathway and a second chute continuously extended from the positioning point toward a second side of the guide groove, so that one end of the guide rod is capable of moving back to the fixed point via the second chute to form a cyclic slip.

DETAILED DESCRIPTION OF THE PREFERRED EMBODIMENTS

Figure 1:
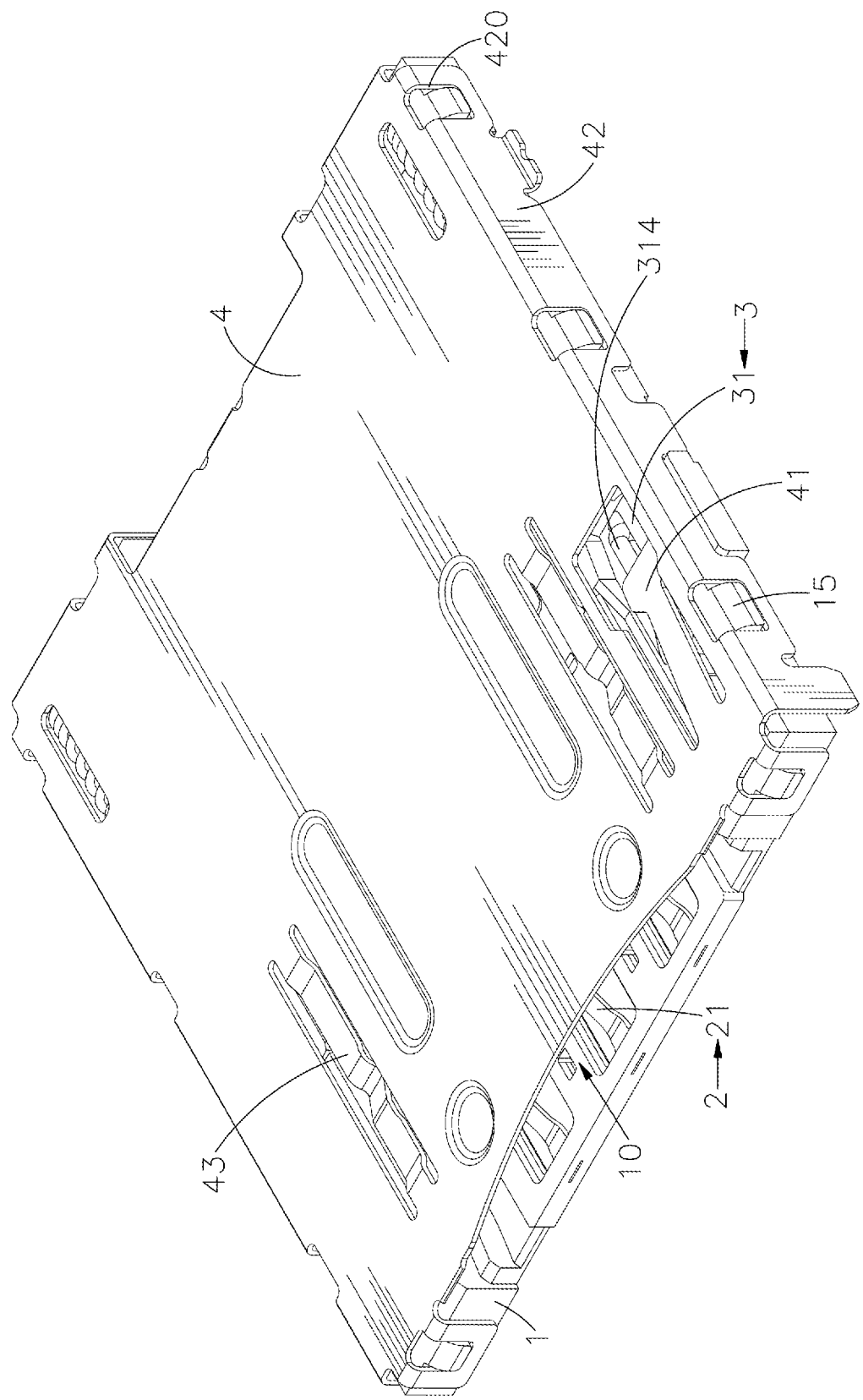
FIG. 1 is a three-dimensional view of the card connector of the present invention.
Figure 2:
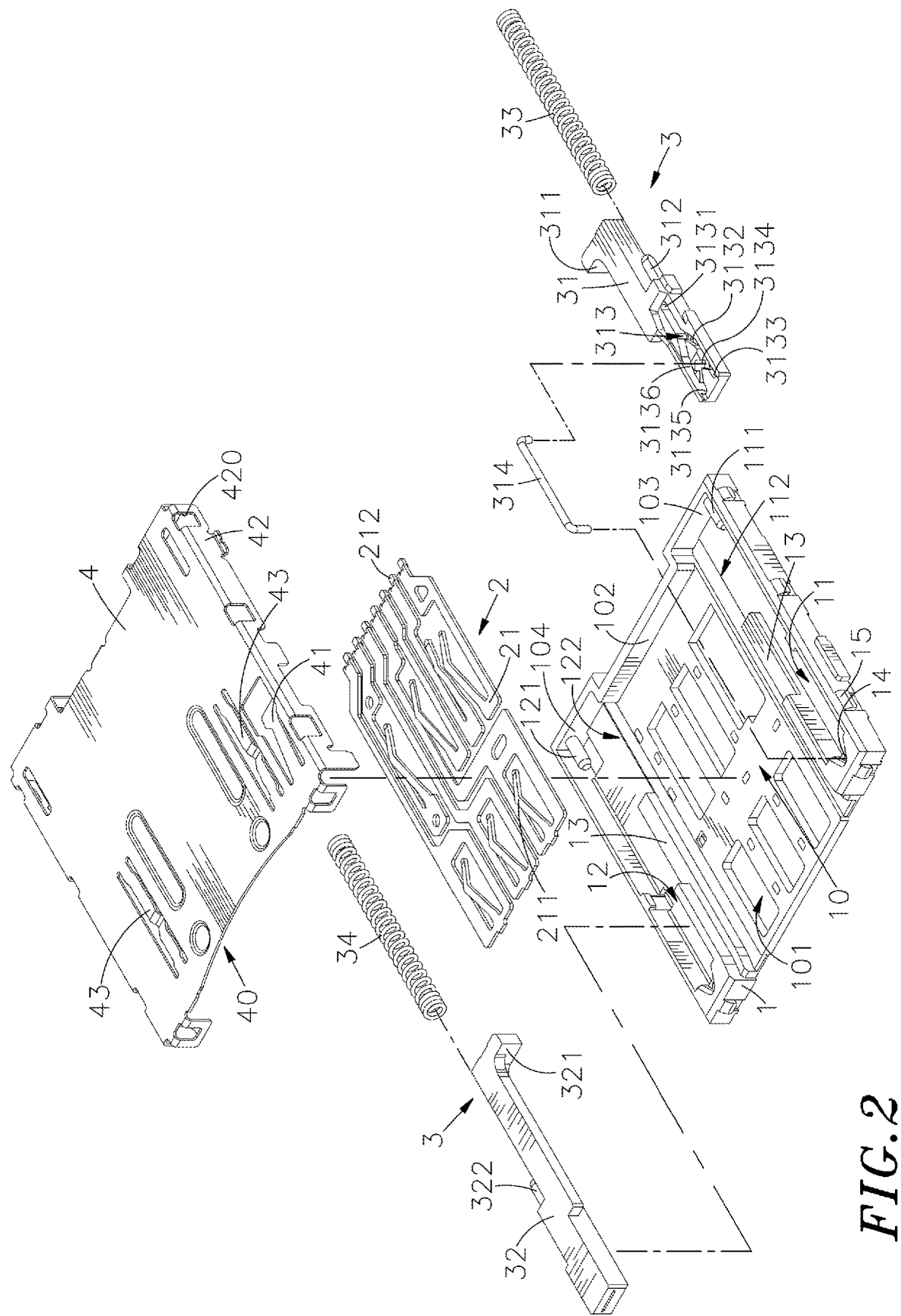
FIG. 2 is a three-dimensional exploded view of a card connector of the present invention.
Figure 3:
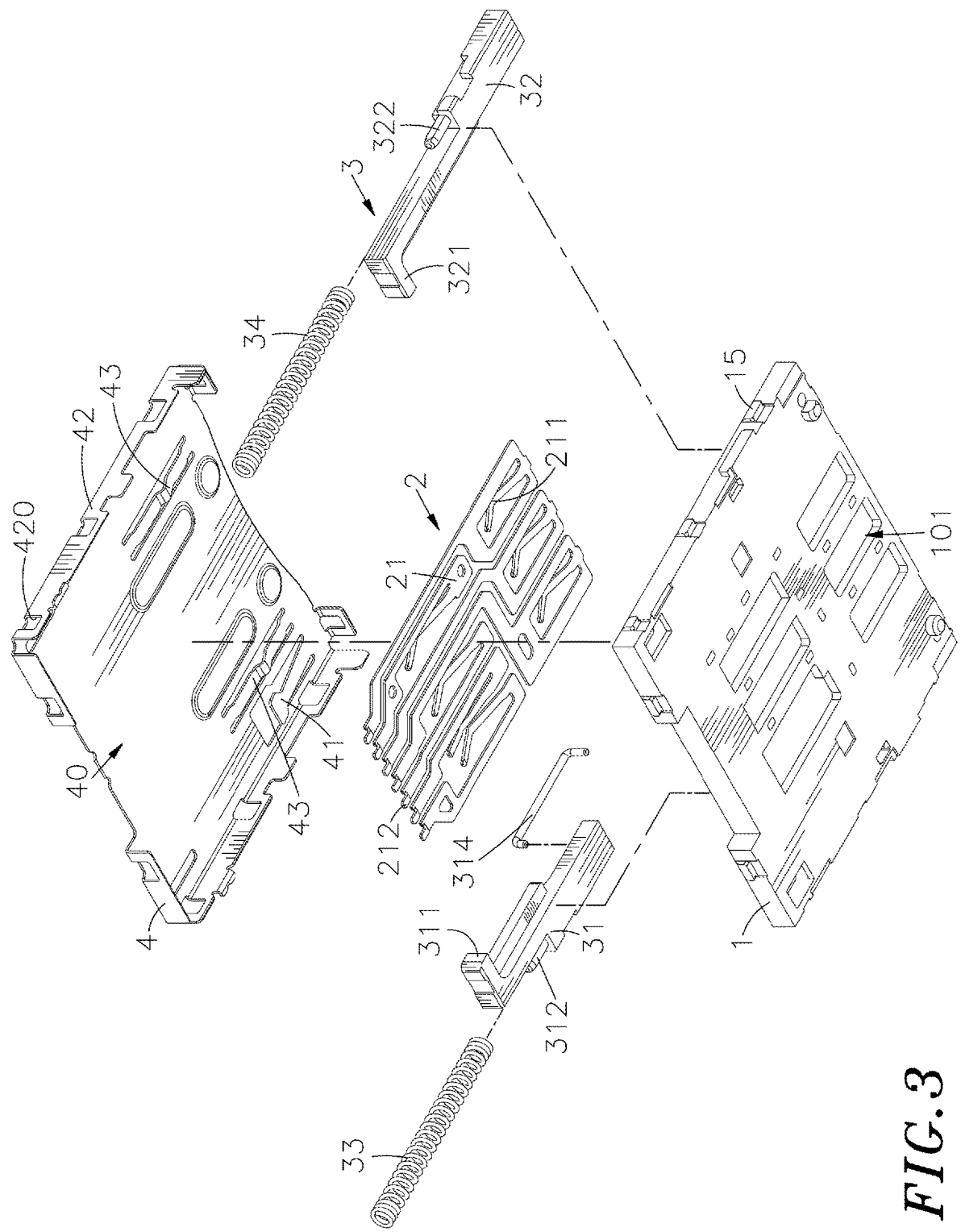
FIG. 3 is a three-dimensional exploded view of a card connector of the present invention, when viewed from another angle.

In order to achieve the above-mentioned purpose and effect, the technical means and structure adopted by the present invention are hereby drawn in detail to illustrate the features and functions of the preferred embodiments of the present invention as follows, so as to facilitate a complete understanding.

Please refer to FIGS. 1 to 8, it can be clearly seen from the figures that the card connector of the present invention mainly comprises: an insulating holder base 1, a terminal set 2, a push-push mechanism 3 and a shielding shell 4, the main components and features of which are detailed below:

The insulating holder base 1 comprises a plug-in space 10 inside, and two raised partitions 13 formed in the plug-in space 10 to define a first slideway 11 and a second slideway 12 in two opposite lateral sies of the plug-in space 10. The terminal set 2 comprises a plurality of conductive terminals 21 that are pierced through the bottom plate of the plug-in space 10. The terminal set 2 is combined with the insulating holder base 1 through the insert molding process.

The push-push mechanism 3 comprises a main sliding seat 31 arranged in the first slideway 11 and an auxiliary sliding seat 32 arranged in the second slideway 12, and the main sliding seat 31 and the auxiliary sliding seat 32 are each in an independent structure. A first elastic member 33 is provided between the main sliding seat 31 and a first positioning inner wall 103 of the first slideway 11. The main sliding seat 31 comprises a first resisting arm 311 extended from one end thereof toward the plug-in space 10, a cyclic guide groove 313 provided on the other end thereof opposite to the first resisting arm 311, and a guide rod 314 that has one end thereof used for sliding positioning in the guide groove 313 and an opposite end thereof installed in the insulating holder base 1. A second elastic member 34 is provided between the auxiliary sliding seat 32 and a second positioning inner wall 104 of the second slideway 12. The auxiliary sliding seat 32 comprises a second resisting arm 321 extended from one side thereof toward the plug-in space 10. The first resisting arm 311 and the second resisting arm 321 are used for resisting and moving the combined structure of a preset SIM card 5 and a tray 6. When the main sliding seat 31 and the auxiliary sliding seat 32 are moving, the main sliding seat 31 has a greater resistance than the auxiliary sliding seat 32.

The shielding shell 4 is covered and assembled on the outside of the insulating holder base 1 and the push-push mechanism 3, and the shielding shell 4 is provided with a pressing piece 41 that is pressed downward against the top side of the guide rod 314.

The insulating holder base 1 further comprises a plurality of through-holes 101 located on the bottom plate of the plug-in space 10. The conductive terminals 21 each comprise a butt portion 211 bent and arched upward corresponding to one respective through-hole 101, and a welding portion 212 exposed to the insulating holder base 1.

A first passage 112 for accommodating the first resisting arm 311 of the main sliding seat 31 is formed between the above-mentioned plug-in space 10 and the first slideway 11, and the plug-in space 10 has a stop wall 102 far away from the insertion opening. A second passage 122 for accommodating the second resisting arm 321 of the auxiliary sliding seat 32 is formed between the plug-in space 10 and the second slideway 12.

The first positioning inner wall 103 of the above-mentioned first slideway 11 is further protruded with a first positioning rod 111. The main sliding seat 31 is provided with a first limiting rod 312 corresponding to the first positioning rod 111. The first positioning rod 111 and the first limiting rod 312 are used for the positioning of the two opposite ends of the first elastic member 33. The side of the first slideway 11 away from the first positioning inner wall 103 is provided with a limit hole 14 for one end of the guide rod 314 to pass through and position.

The second positioning inner wall 104 of the above-mentioned second slideway 12 is further protruded with a second positioning rod 121. The auxiliary sliding seat 32 is provided with a second limiting rod 322 corresponding to the second positioning rod 121. The second positioning rod 121 and the second limiting rod 322 are used for the positioning of the two opposite ends of the second elastic member 34.

Figure 9:
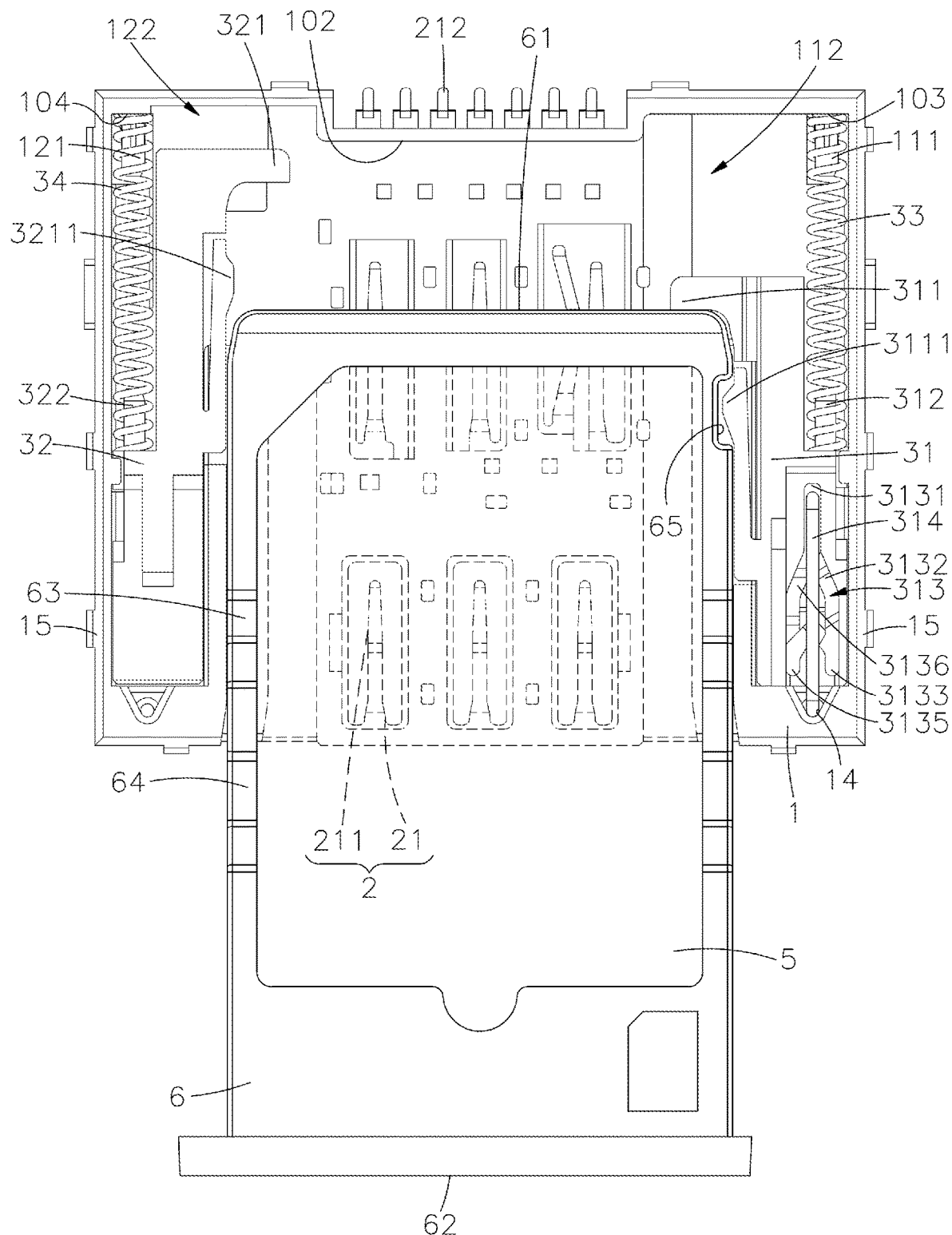
FIG. 9 is a top view of an application implementation of the said another card connector of the present invention before card insertion.

As shown in FIG. 9, the length of the main sliding seat 31 is shorter than that of the auxiliary sliding seat 32, and the first resisting arm 311 of the main sliding seat 31 and the second resisting arm 321 of the auxiliary sliding seat 32 are used for asynchronous movement when the combined structure of the SIM card 5 and the tray 6 is resisted.

Figure 12:
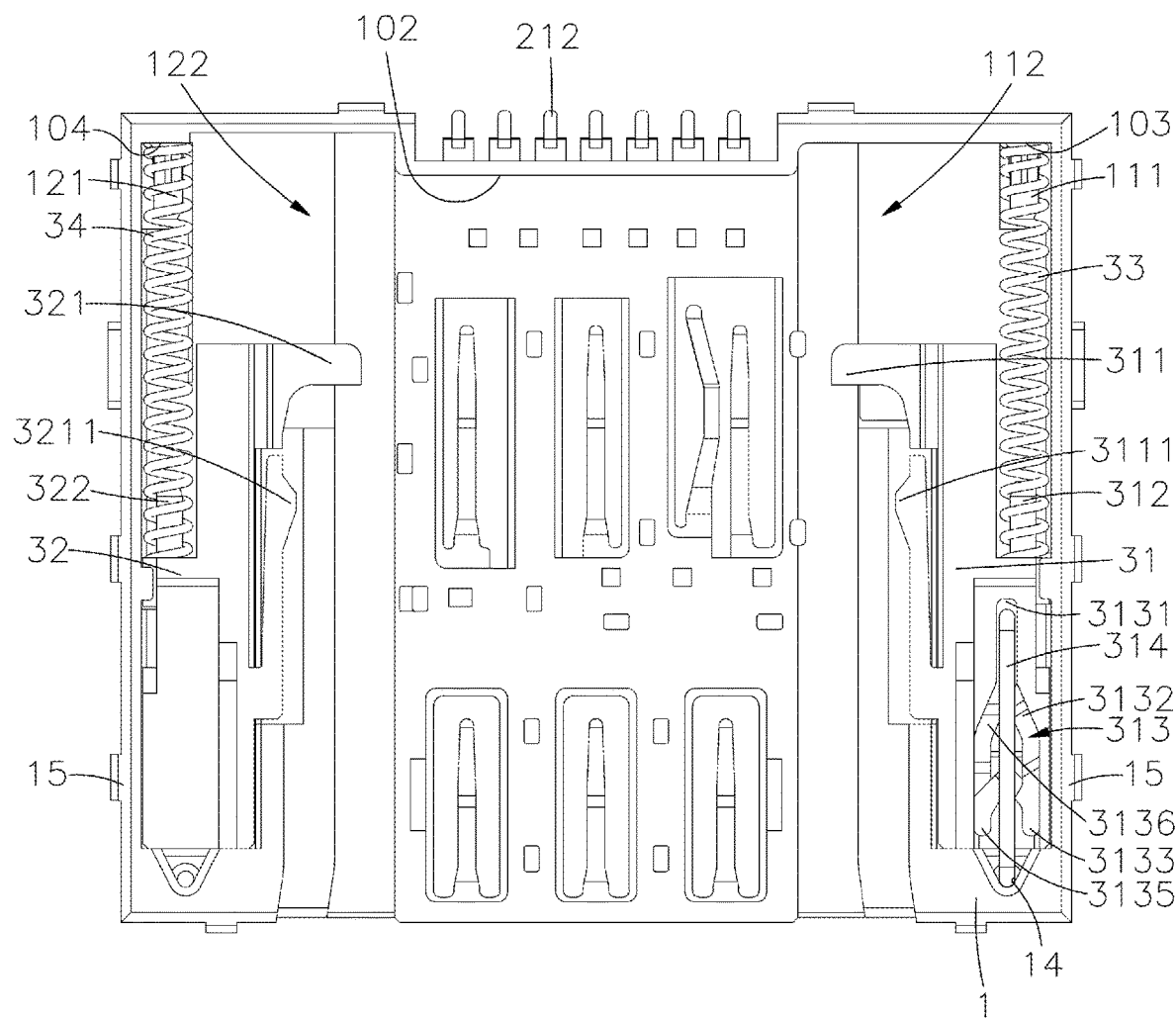
FIG. 12 is a top view of the card connector of the present invention installed with another push-push mechanism.
Figure 13:
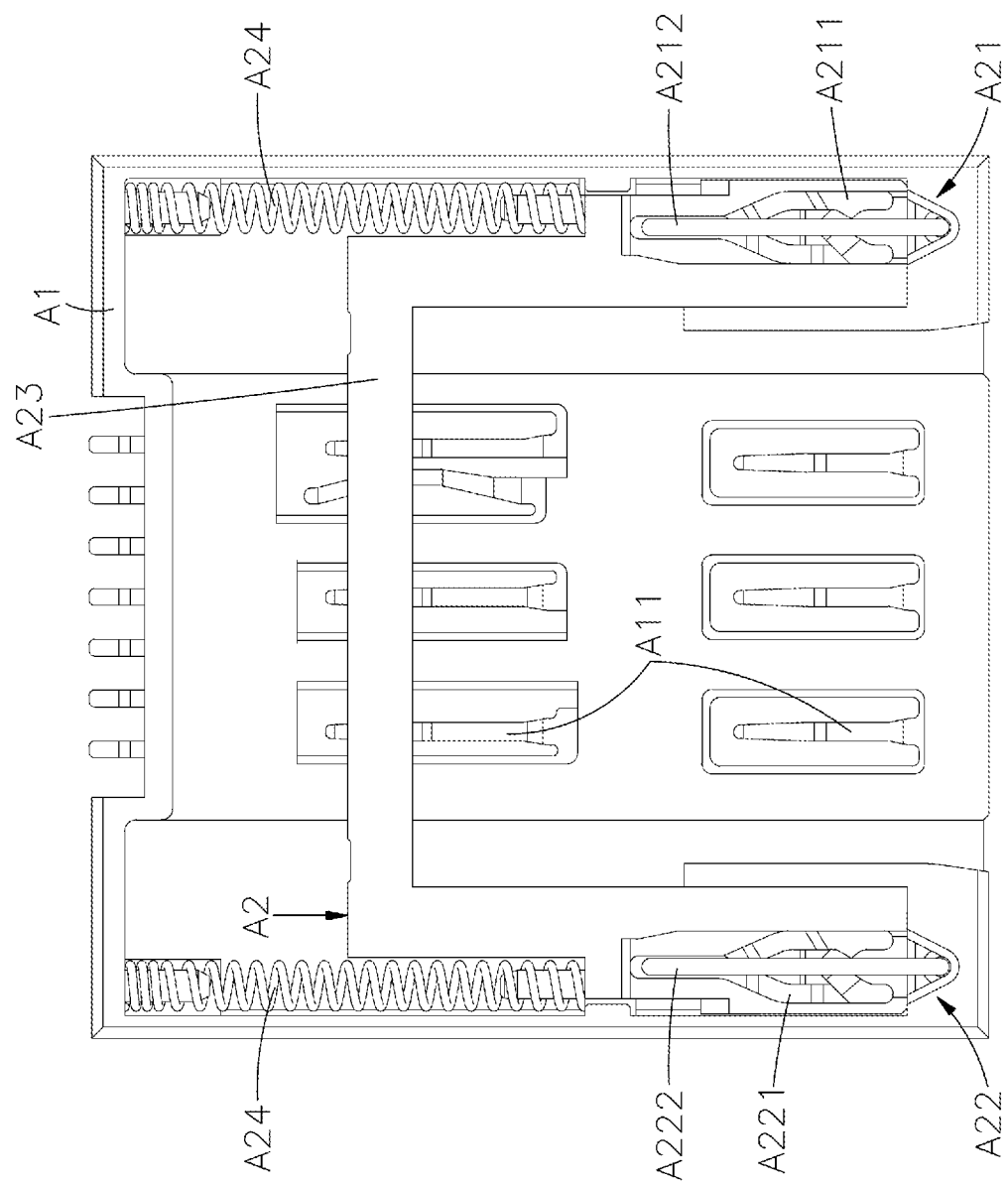
FIG. 13 is a structural top view of a conventional card connector.
Figure 14:
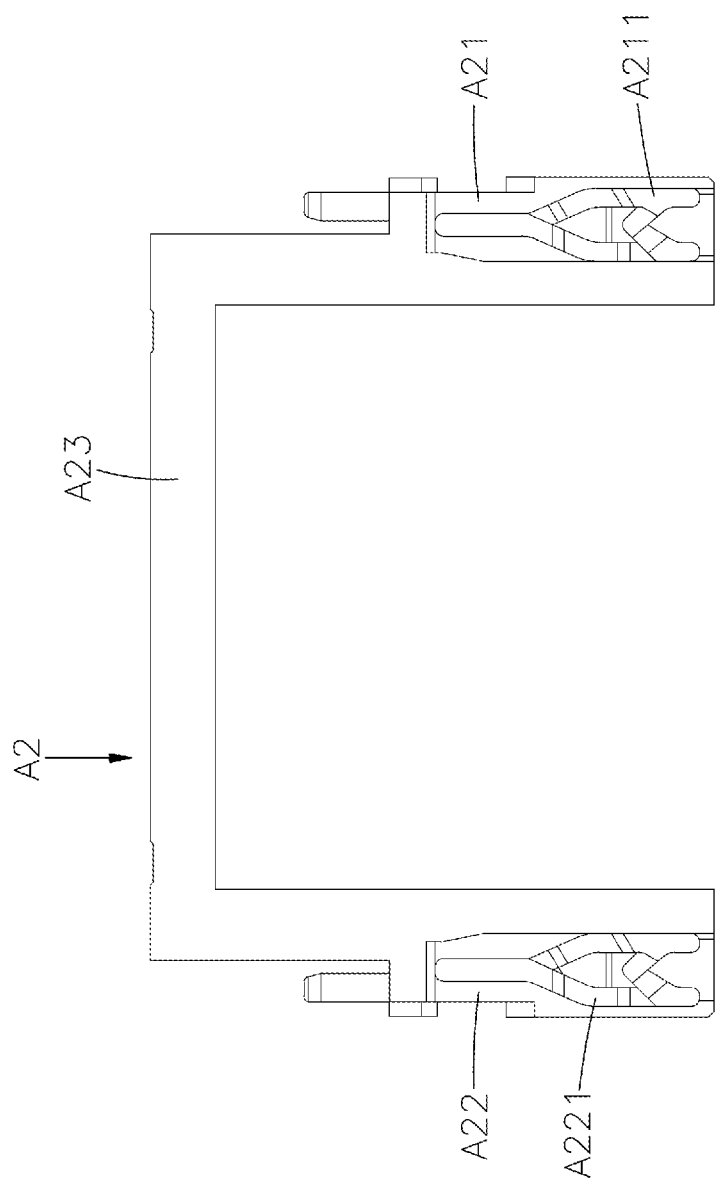
FIG. 14 is a top view of a structure of a conventional pusher.

As shown in FIG. 12, the length of the main sliding seat 31 is equal to the auxiliary sliding seat 32, and the first resisting arm 311 of the main sliding seat 31 and the second resisting arm 321 of the auxiliary sliding seat 32 are used for synchronous movement when the combined structure of the SIM card 5 and the tray 6 is resisted.

The above-mentioned main sliding seat 31 is provided with the cyclic and heart-shaped guide groove 313. The guide groove 313 has a fixed point 3131 for one end of the guide rod 314 to slide to a first position, a first chute 3132 and a first pathway 3133 continuously extended from the fixed point 3131 toward a first side of the guide groove 313, a positioning point 3134 traversing from the first pathway 3133 to a heart-shaped depression therein for one end of the guide rod 314 to slide to a second position, and a second pathway 3135 and a second chute 3136 continuously extended from the positioning point 3134 toward a second side of the guide groove 313, so that the one end of the guide rod 314 can move back to the fixed point 3131 via the second chute 3136 to form a cyclic slip.

The above-mentioned shielding shell 4 has an accommodating space 40 inside and the cantilevered pressing piece 41 extends toward the accommodating space 40. The shielding shell 4 further has a plurality of extension shell portions 42 extending downwards from four sides thereof, and a plurality of buckle holes 420 located on the extension shell portions 42 for the fastening of a plurality of buckles 15 of the insulating holder base 1.

Figure 4:
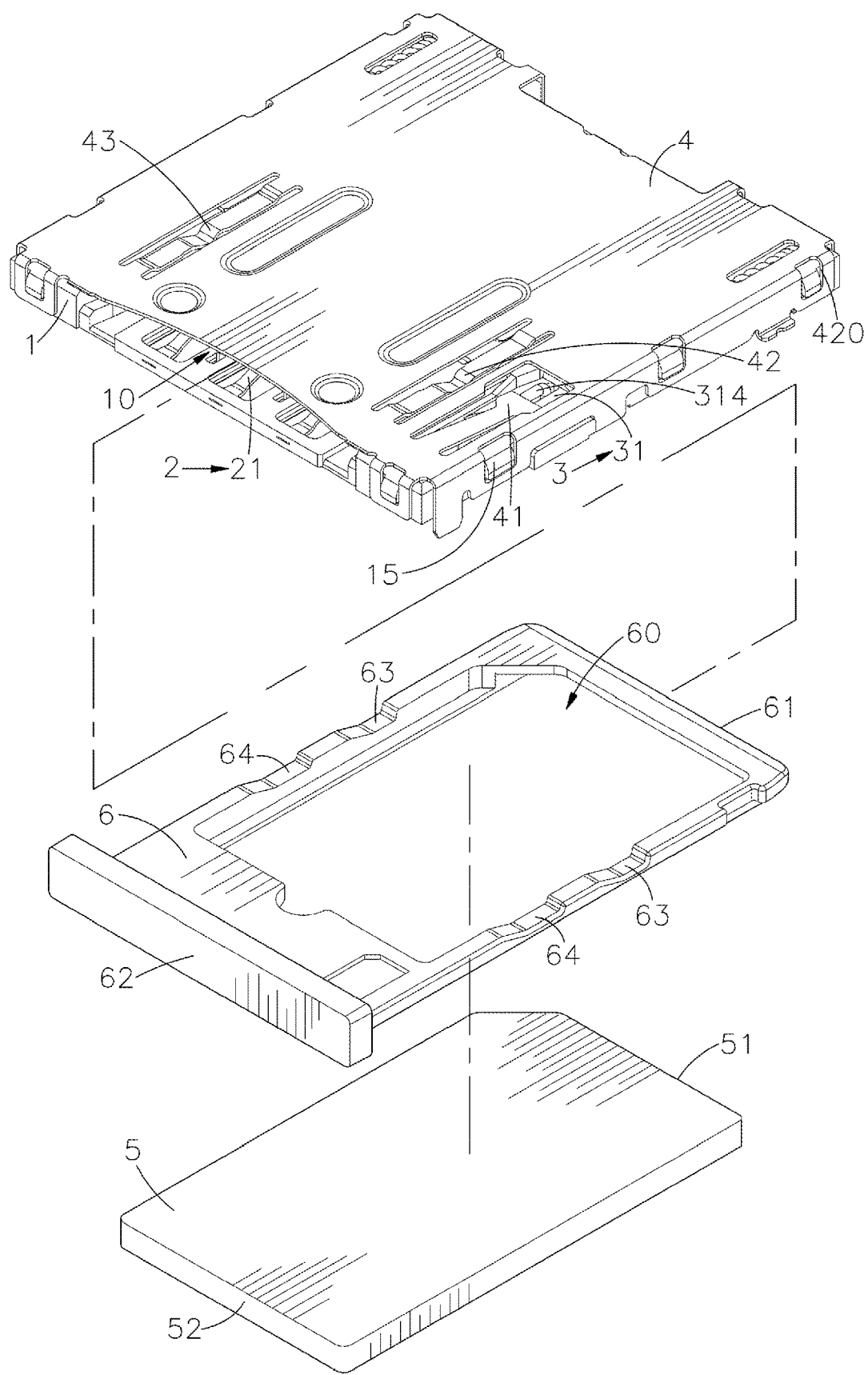
FIG. 4 is a three-dimensional exploded view of an application implementation of the card connector of the present invention.
Figure 5:
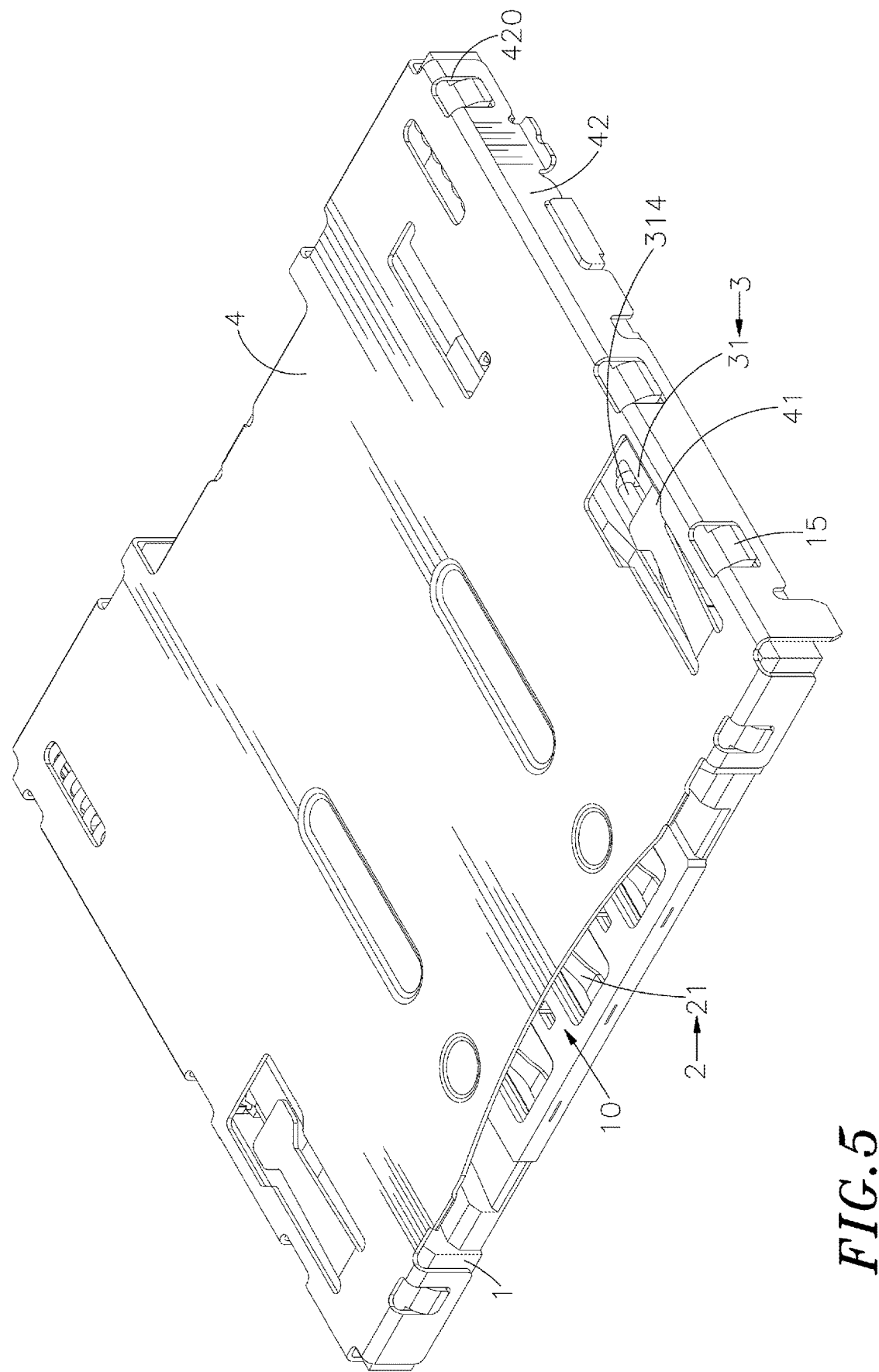
FIG. 5 is a three-dimensional view of another card connector of the present invention.
Figure 6:
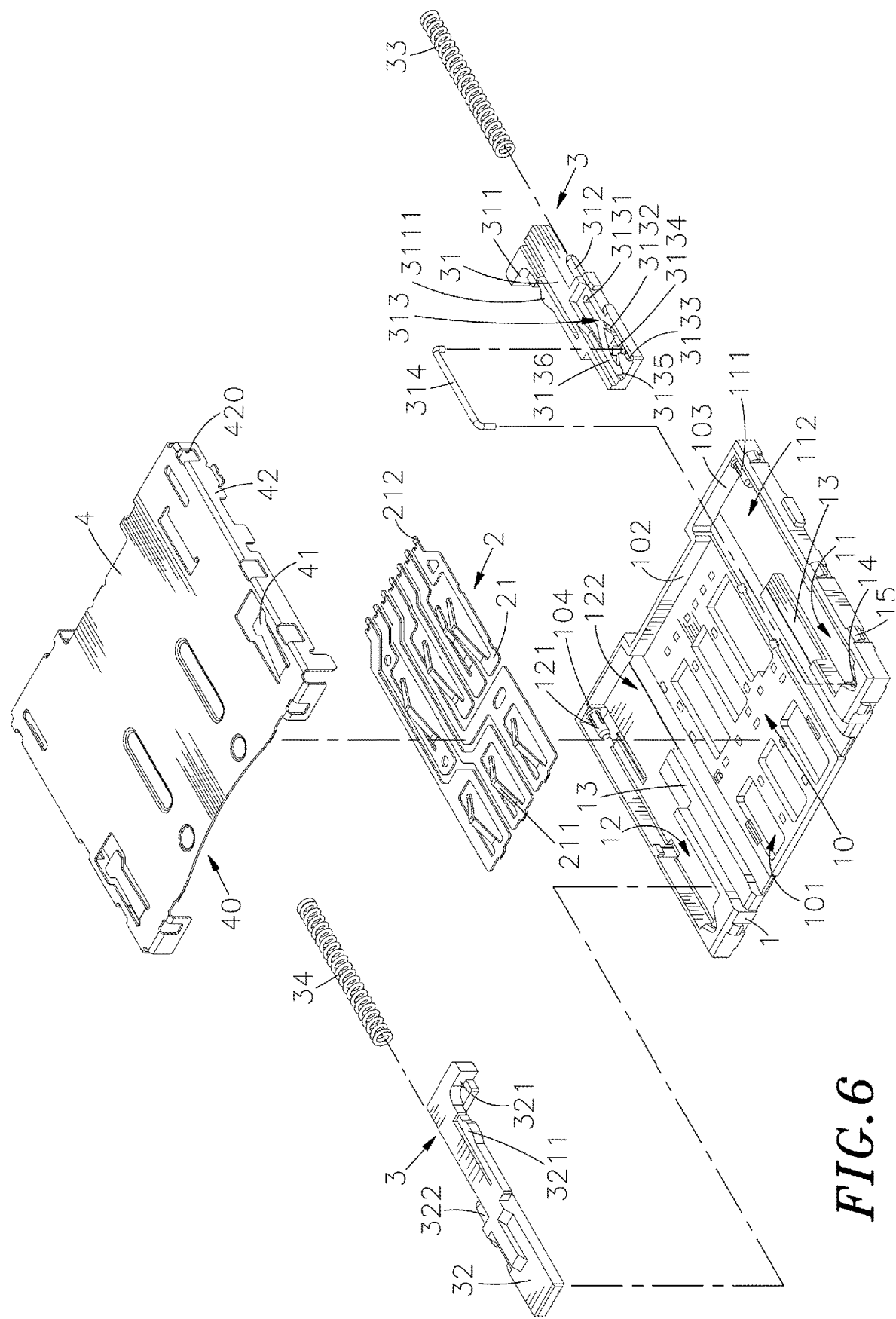
FIG. 6 is a three-dimensional exploded view of another card connector of the present invention.
Figure 7:
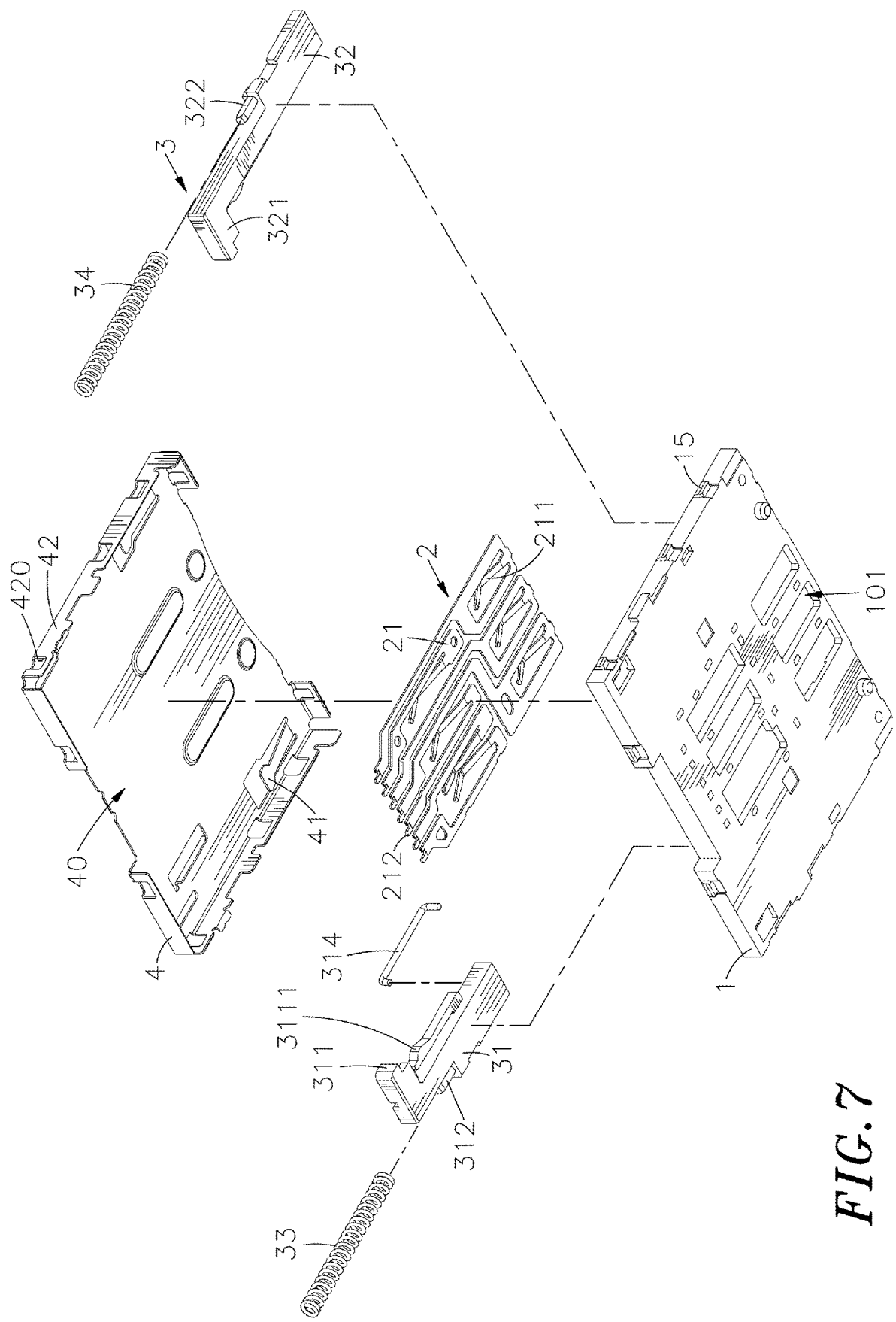
FIG. 7 is a three-dimensional exploded view of the said another card connector of the present invention, when viewed from another angle.
Figure 8:
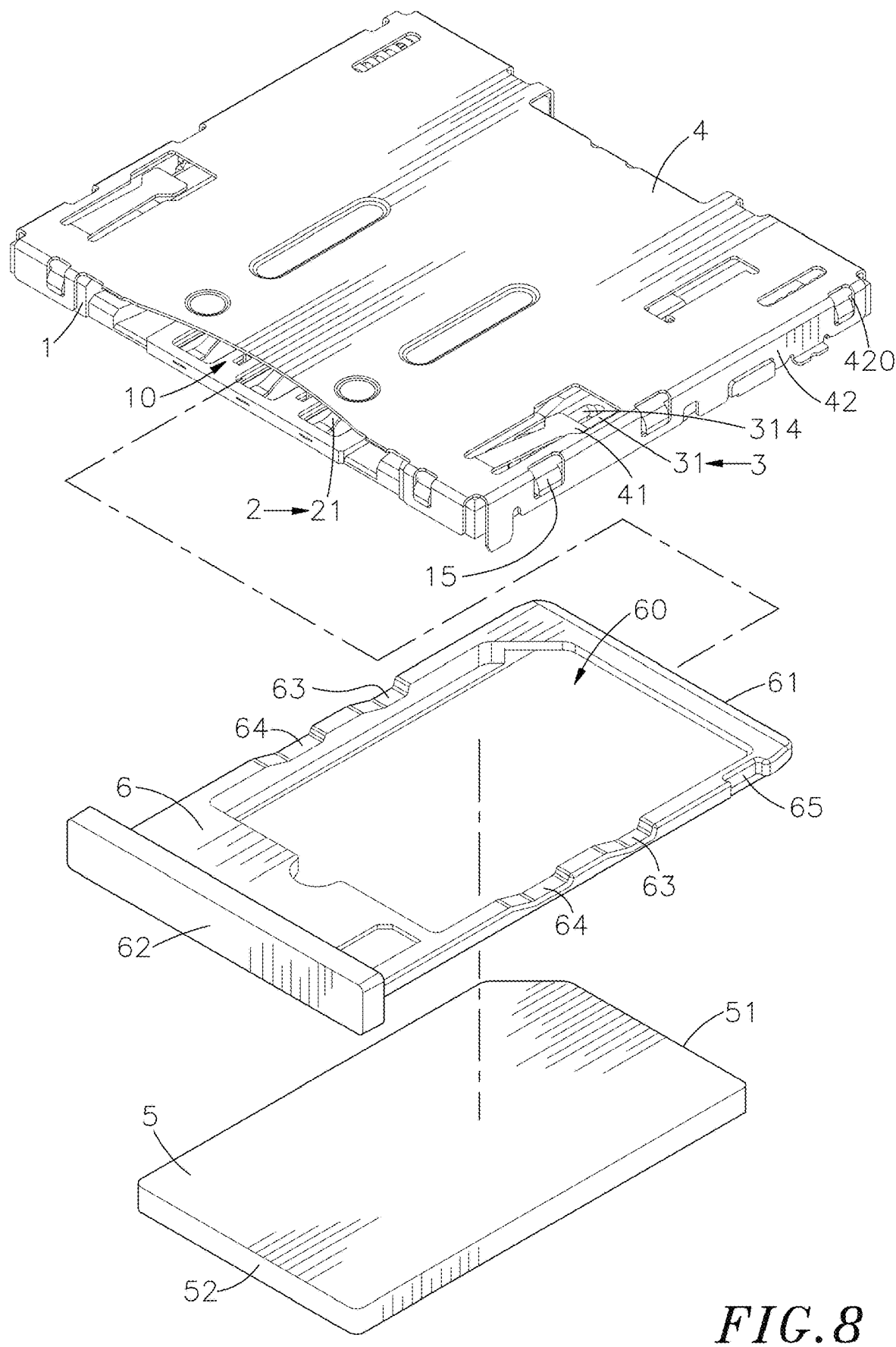
FIG. 8 is a three-dimensional exploded view of an application implementation of the said another card connector of the present invention.

As shown in FIG. 4, the two short sides of the SIM card 5 are respectively formed with a front edge 51 and a rear edge 52. A preferred embodiment of the SIM card 5 is to use the tray 6 as a carrier to be plugged into the card connector. The inside of the tray 6 has a storage space 60 for the storage and positioning of the SIM card 5. The tray 6 forms an abutment side 61 corresponding to the front edge 51 of the SIM card 5 and forms an operation side 62 corresponding to the rear edge 52. The two long sides of the tray 6 are recessed to form a first retaining groove 63 and a second retaining groove 64 for the two engaging members 43 protruding downwards of the shielding shell 4 to do a resisting positioning. One of the two long sides of the tray 6 is further recessed with a positioning groove 65. The combined structure of the SIM card 5 and the tray 6 can be inserted into the plug-in space 10 of the card connector to form positioning and electrical connection.

Figure 10:
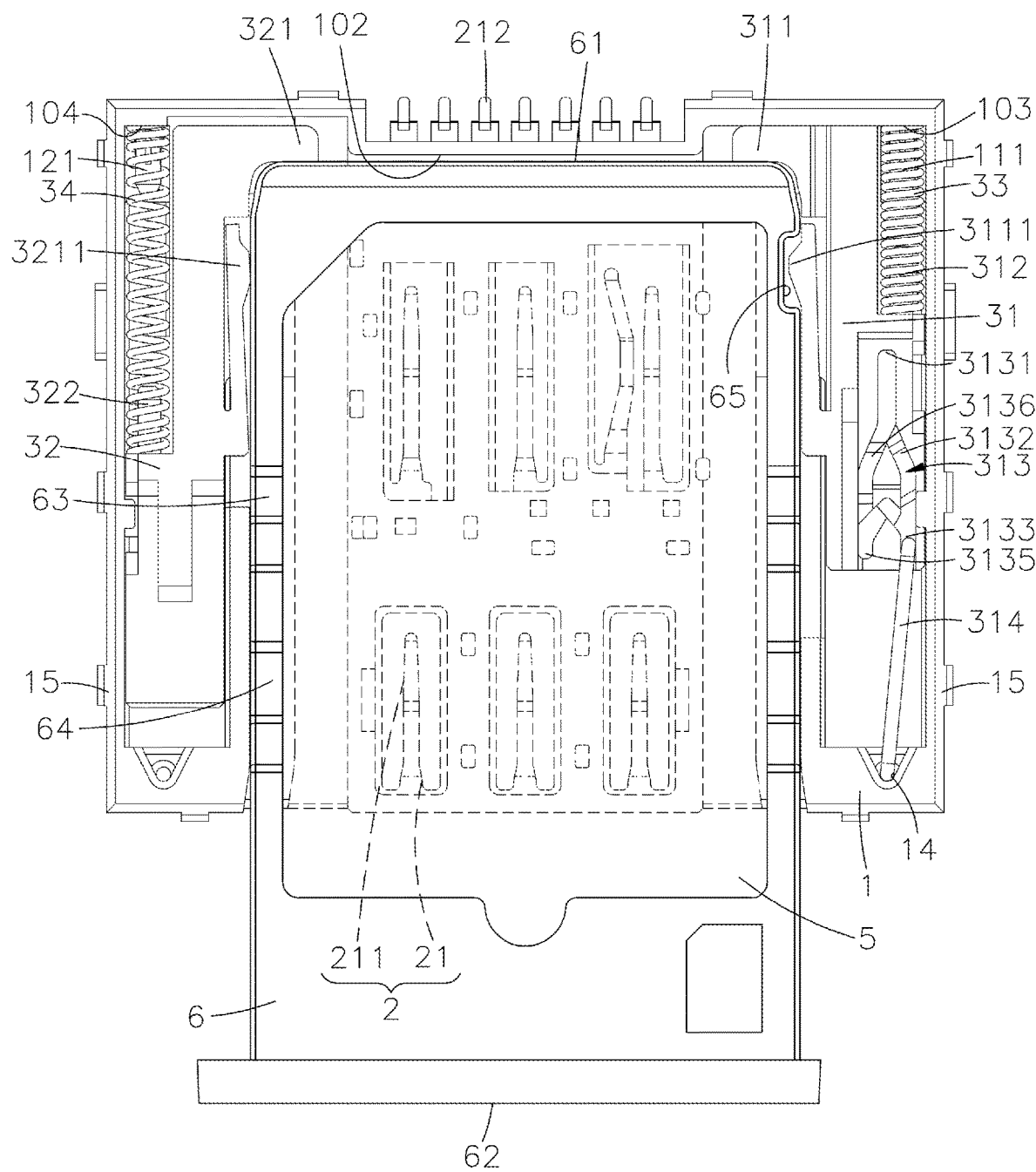
FIG. 10 is a top view of an application implementation of the said another card connector of the present invention during the card insertion action.
Figure 11:
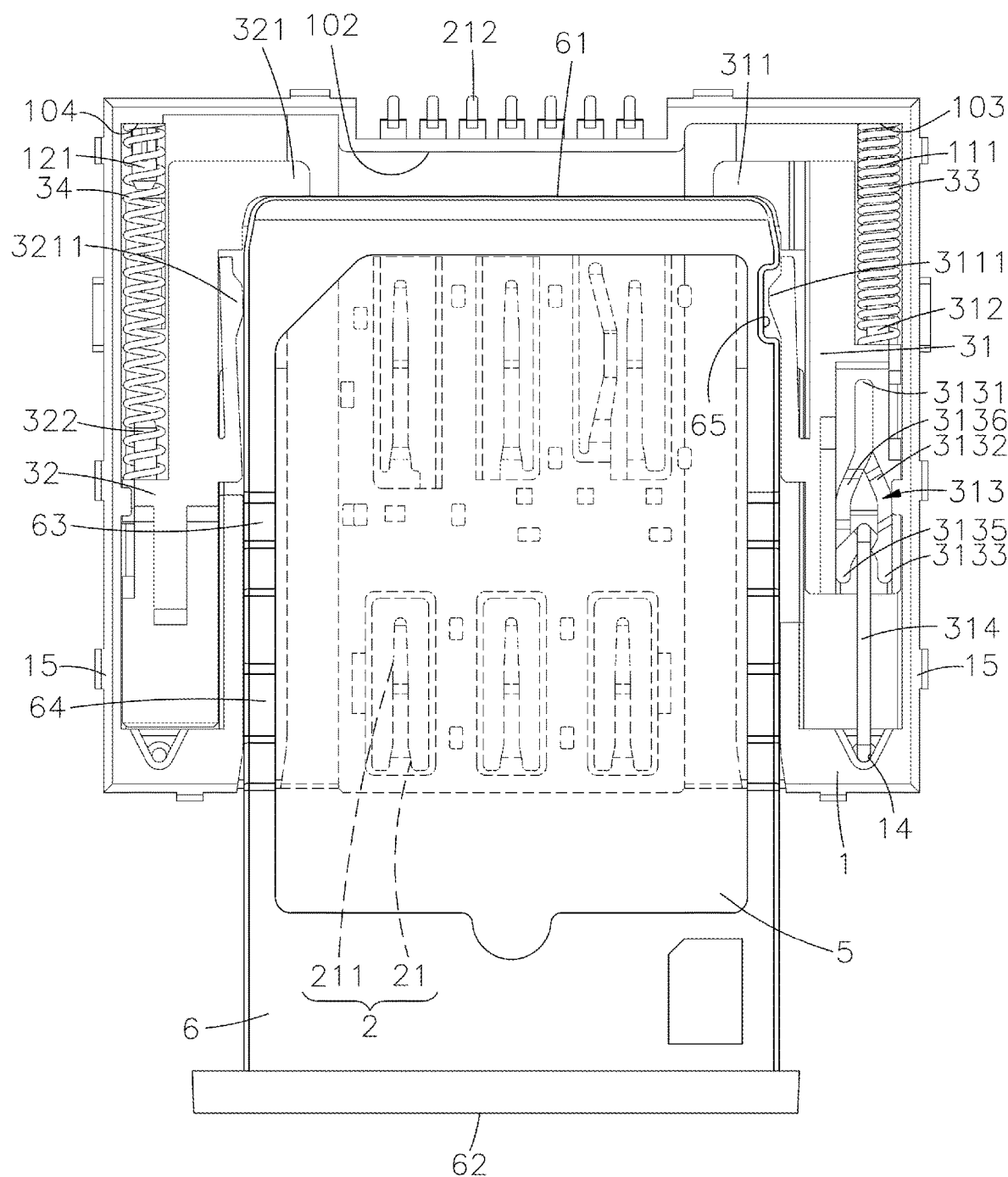
FIG. 11 is a top view of an application implementation of the said another card connector of the present invention after the card insertion action.

Please refer to FIGS. 9 to 11. In actual operation, insert the SIM card 5 into the storage space 60 of the tray 6 to form a positioning, and then align the abutment side 61 of the tray 6 with the plug-in space 10 of the insulating holder base 1 and apply force to the operation side 62 to push in, so that the abutment side 61 of tray 6 is held between the first resisting arm 311 of the main sliding seat 31 and the second resisting arm 321 of the auxiliary sliding seat 32. Since the main sliding seat 31 is equipped with the cyclic guide groove 313 and the guide rod 314 for sliding positioning, it forms a large sliding resistance, while the auxiliary sliding seat 32 has no guide groove and guide rod structure, so it forms a small sliding resistance. The main sliding seat 31 forms the positioning structure for inserting the tray 6 into the card connector, and the auxiliary sliding seat 32 only maintains the balance of the abutment side 61 of the tray 6 without any positioning structure. After the main sliding seat 31 and the auxiliary sliding seat 32 slide to the fixed point in the first slideway 11 and the second slideway 12, the two engaging members 43 protruding downward from the shielding shell 4 are respectively snapped into the first retaining grooves 63 or second retaining grooves 64 on both sides of the tray 6 to form a positioning, and at the same time, the plurality of contacts set on the SIM card 5 form an electrical connection with the butt portions 211 of the conductive terminals 21, and the combined structure of the SIM card 5 and the tray 6 is inserted into the card connector in a balanced and stable manner to form a positioning.

Based on the above, inserting the combined structure of the SIM card 5 and the tray 6 into the card connector is more detailed as follows: Aim the abutment side 61 of the tray 6 at the plug-in space 10 of the insulating holder base 1 and applies force to the operation side 62 to push in. The abutment side 61 of the tray 6 first resists the inner edge of the first resisting arm 311 of the main sliding seat 31, and the positioning snap button, referenced by 3111, on the inner side of the first resisting arm 311 is buckled into the positioning groove 65 on one side of the tray 6 and the resisting elastomer, referenced by 3211, of the second resisting arm 321 resists against the other side of the tray 6, so that the tray 6 is clamped by the positioning snap button 3111 and the resisting elastomer 3211. Continue to apply force on the operation side 62 of the tray 6 to move towards the inside of the plug-in space 10, and the abutment side 61 of the tray 6 is then resisted against the inner edge of second resisting arm 321 of the auxiliary sliding seat 32 to drive the main sliding seat 31 and the auxiliary sliding seat 32 slide along the first slideway 11 and the second slideway 12 respectively, and at the same time, compress the first elastic member 33 and the second elastic member 34. During the sliding process, one end of the guide rod 314 of the main sliding seat 31 slides along the heart-shaped cyclic guide groove 313. The starting point at one end of the guide rod 314 slides from the fixed point 3131 of the guide groove 313 (as shown in FIG. 9) through the first chute 3132 to the first pathway 3133 (as shown in FIG. 10). At this point, remove the force applied to the operation side 62 of the tray 6, and the main sliding seat 31 and the auxiliary sliding seat 32 are pushed toward the opening of the plug-in space 10 by the elastic restoring force of the first and second elastic members 33 and 34. At this time, the one end of the guide rod 314 slides and holds against the positioning point 3134, and makes the abutment side 61 of the tray 6 touch the stop wall 102, and then withdraw slightly to the outside of the insulating holder base 1 to form a positioning. And the abutment side 61 of the tray 6 forms an appropriate distance with the stop wall 102 of the plug-in space 10 (as shown in FIG. 11), and at the same time, the two engaging members 43 protruding downward from the shielding shell 4 do a resisting positioning and are respectively buckled and positioned in the first retaining grooves 63 or the second retaining grooves 64 on both sides of the tray 6. The more detailed card insertion action is then completed through the above.

Please refer to FIG. 12 again, which is a top view of the card connector of the present invention installed with another push-push mechanism. The action of inserting the combined structure of the SIM card 5 and the tray 6 into the card connector differs from that disclosed in FIGS. 9-11 only in that: During the process of applying force to the tray 6, the abutment side 61 of the tray 6 resists the inner edge of the first resisting arm 311 of the main sliding seat 31 and the inner edge of the second resisting arm 321 of the auxiliary sliding seat 32 at the same time, so as to drive the main sliding seat 31 and the auxiliary sliding seat 32 slide along the first slideway 11 and the second slideway 12 respectively. The rest of the action process is the same as the content disclosed in FIGS. 9~11, so I will not make a separate text description.

If you want to withdraw the combined structure of the SIM card 5 and the tray 6 from the plug-in space 10 of the insulating holder base 1, you only need to apply force to the operation side 62 of the tray 6 to push the tray 6 into the plug-in space 10, and the force applied to the operation side 62 of the tray 6 can be released, so that the elastic restoring force of the first and second elastic members 33 and 34 can push the main sliding seat 31 and the auxiliary sliding seat 32 to slide along the first slideway 11 and the second slideway 12 respectively, and drive one end of the guide rod 314 of the main sliding seat 31 slide again along the heart-shaped cyclic guide groove 313. The one end of the guide rod 314 starts to slide from the positioning point 3134 to the second chute 3136 via the second pathway 3135, and then move back to the fixed point 3131 via the second chute 3136. Thus, the main sliding seat 31 and the auxiliary sliding seat 32 are pushed by the first and second elastic members 33 and 34, and the combined structure of the SIM card 5 and the tray 6 is pushed out of the plug-in space 10 of the insulating holder base 1. At this time, the positioning snap button 3111 of the first resisting arm 311 also slides away from the positioning groove 65 of the tray 6, and the withdrawing action of the combined structure of the SIM card 5 and the tray 6 as described above is completed.

The main features of the present invention are that the main sliding seat 31 and the auxiliary sliding seat 32 of the card connector are designed independently and separately; the main sliding seat 31 has a cyclic guide groove 313 and a guide rod 314 for sliding positioning to form a large sliding resistance, while the auxiliary sliding seat 32 has no guide groove and guide rod structure to form a small sliding resistance; the main sliding seat 31 is used to form the positioning structure for the combined structure of the SIM card 5 and the tray 6 to be inserted into of the first position and the second position in the card connector, while the auxiliary sliding seat 32 only maintains the balance of the front end of the card edge without any positioning structure. This kind of design can effectively avoid the problem of uneven movement or jamming between the push-push mechanism and the insulating holder base when the sliding movements on both sides of the conventional card connector are not synchronized, so the present invention can achieve the advantages of smooth operation and long service life.

What is claimed is:

1. A card connector, comprising:
   an insulating holder base comprising a plug-in space inside, said plug-in space with a bottom plate and an insertion opening, and two raised partitions formed in said plug-in space to define a first slideway and a second slideway in two opposite lateral sides of said plug-in space;
   a terminal set comprising a plurality of conductive terminals pierced through said bottom plate of said plug-in space;
   a push-push mechanism comprising a main sliding seat arranged in said first slideway and an auxiliary sliding seat arranged in said second slideway, a first elastic member provided between said main sliding seat and a first positioning inner wall of said first slideway and a second elastic member provided between said auxiliary sliding seat and a second positioning inner wall of said second slideway, said main sliding seat and said auxiliary sliding seat being each in an independent structure, said main sliding seat comprising a first resisting arm extended from one end thereof toward said plug-in space, a cyclic guide groove provided on an opposite end thereof opposite to said first resisting arm and a guide rod, said guide rod having one end thereof used for sliding positioning in said guide groove and an opposite end thereof installed in said insulating holder base, said auxiliary sliding seat comprising a second resisting arm extended from one side thereof toward said plug-in space, said first resisting arm and said second resisting arm being used for resisting and moving a combined structure of a preset SIM card and a tray, so that when said main sliding seat and said auxiliary sliding seat are moving, said main sliding seat has a greater resistance than said auxiliary sliding seat; and
   a shielding shell covered and assembled on an outside of said insulating holder base and said push-push mechanism, said shielding shell comprising a pressing piece pressed downward against a top side of said guide rod.

2. The card connector as claimed in claim 1, wherein said insulating holder base further comprises a plurality of through-holes located on said bottom plate of said plug-in space; said conductive terminals each comprise a butt portion bent and arched upward corresponding to one respective said through-hole, and a welding portion exposed to said insulating holder base.

3. The card connector as claimed in claim 1, wherein said insulating holder base further comprises a first passage formed between said plug-in space and said first slideway for accommodating said first resisting arm of said main sliding seat, and a stop wall located in said plug-in space opposite from the insertion opening.

4. The card connector as claimed in claim 3, wherein said insulating holder base further comprises a second passage formed between said plug-in space and said second slideway for accommodating said second resisting arm of said auxiliary sliding seat.

5. The card connector as claimed in claim 1, wherein said first positioning inner wall of said first slideway is protruded with a first positioning rod; said main sliding seat is provided with a first limiting rod corresponding to said first positioning rod; said first elastic member has two opposite ends thereof respectively positioned on said first positioning rod and said first limiting rod; said first slideway is provided with a limit hole on one side thereof opposite said first positioning inner wall for one end of said guide rod to pass through and position.

6. The card connector as claimed in claim 5, wherein said second positioning inner wall of said second slideway is protruded with a second positioning rod; said auxiliary sliding seat is provided with a second limiting rod corresponding to said second positioning rod; said second elastic member has two opposite ends thereof respectively positioned on said second positioning rod and said second limiting rod.

7. The card connector as claimed in claim 1, wherein said terminal set is combined with said insulating holder base through an insert molding process.

8. The card connector as claimed in claim 1, wherein a length of said main sliding seat is shorter than that of said auxiliary sliding seat, and said first resisting arm of said main sliding seat and said second resisting arm of said auxiliary sliding seat are used for asynchronous movement when the combined structure of said SIM card and said tray is resisted.

9. The card connector as claimed in claim 1, wherein a length of said main sliding seat is equal to said auxiliary sliding seat, and said first resisting arm of said main sliding seat and said second resisting arm of said auxiliary sliding seat are used for synchronous movement when the combined structure of said SIM card and said tray is resisted.

10. The card connector as claimed in claim 1, wherein said cyclic guide groove provided on said main sliding seat is heart-shaped, comprising a fixed point for one end of said guide rod to slide to a first position, a first chute and a first pathway continuously extended from said fixed point toward a first side of said guide groove, a positioning point traversing from said first pathway to a heart-shaped depression therein for one end of said guide rod to slide to a second position, and a second pathway and a second chute continuously extended from said positioning point toward a second side of said guide groove, so that one end of said guide rod is capable of moving back to said fixed point via said second chute to form a cyclic slip.

11. The card connector as claimed in claim 1, wherein said shielding shell further comprises an accommodating space inside, a plurality of extension shell portions extending downwards from four sides thereof, and a plurality of buckle holes located on said extension shell portions; said pressing piece of said shielding shell is a cantilever extending toward said accommodating space; said insulating holder base further comprises a plurality of buckles respectively fastened to said buckle holes of said shielding shell.

* * * * *